(12) United States Patent
Liao et al.

(10) Patent No.: US 7,293,126 B2
(45) Date of Patent: Nov. 6, 2007

(54) ENHANCED STRUCTURE OF EXTENSIBLE TIME-SHARING BUS CAPABLE OF REDUCING PIN NUMBER, EXTENDING MEMORY CAPACITY, AND PERFORMING I/O MAPPING ACCESS AND BLOCK ACCESS

(75) Inventors: Tung-Tsai Liao, Hsinchu (TW); Wen-Zen Shih, Taoyuan (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 220 days.

(21) Appl. No.: 11/113,039

(22) Filed: Apr. 25, 2005

(65) Prior Publication Data

US 2005/0240697 A1   Oct. 27, 2005

(30) Foreign Application Priority Data

Apr. 26, 2004   (TW) .............................. 93111652 A (51) Int. Cl.
  *G06F 13/00*   (2006.01)
(52) U.S. Cl. .................... 710/110; 710/105; 710/106; 710/58

(58) Field of Classification Search ................ 710/110, 710/30–35, 305–315, 52–58, 105–106
See application file for complete search history.

(56) References Cited

U.S. PATENT DOCUMENTS

| | | | | |
|---|---|---|---|---|
| 4,481,572 A | * | 11/1984 | Ochsner ...................... | 710/117 |
| 5,499,385 A | * | 3/1996 | Farmwald et al. ............. | 710/3 |
| 5,793,990 A | * | 8/1998 | Jirgal et al. .................. | 710/107 |
| 6,119,189 A | * | 9/2000 | Gafken et al. ............. | 710/110 |
| 6,493,773 B1 | * | 12/2002 | Daniel et al. ................. | 710/52 |
| 6,493,778 B1 | * | 12/2002 | Lee et al. .................... | 710/110 |

* cited by examiner

*Primary Examiner*—Khanh Dang
*Assistant Examiner*—Raymond N Phan
(74) *Attorney, Agent, or Firm*—Bacon & Thomas, PLLC (57) ABSTRACT

An enhanced structure of extensible time-sharing bus, which essentially uses an address and data bus in time-sharing to send addresses and data between a microprocessor and a memory through a microprocessor interface and a memory interface, and a logic combination of two control lines to determine address transfer, data read or data write on the address and data bus, thereby reducing interface pins and obtaining flexible and multiplicative memory.

19 Claims, 14 Drawing Sheets

ENHANCED STRUCTURE OF EXTENSIBLE TIME-SHARING BUS CAPABLE OF REDUCING PIN NUMBER, EXTENDING MEMORY CAPACITY, AND PERFORMING I/O MAPPING ACCESS AND BLOCK ACCESS

BACKGROUND OF THE INVENTION

1. Field of the Invention

The invention relates to a bus among integrated circuits (ICs), and more particularly, to an enhanced structure of extensible time-sharing bus structure.

2. Description of Related Art

Figure 1:
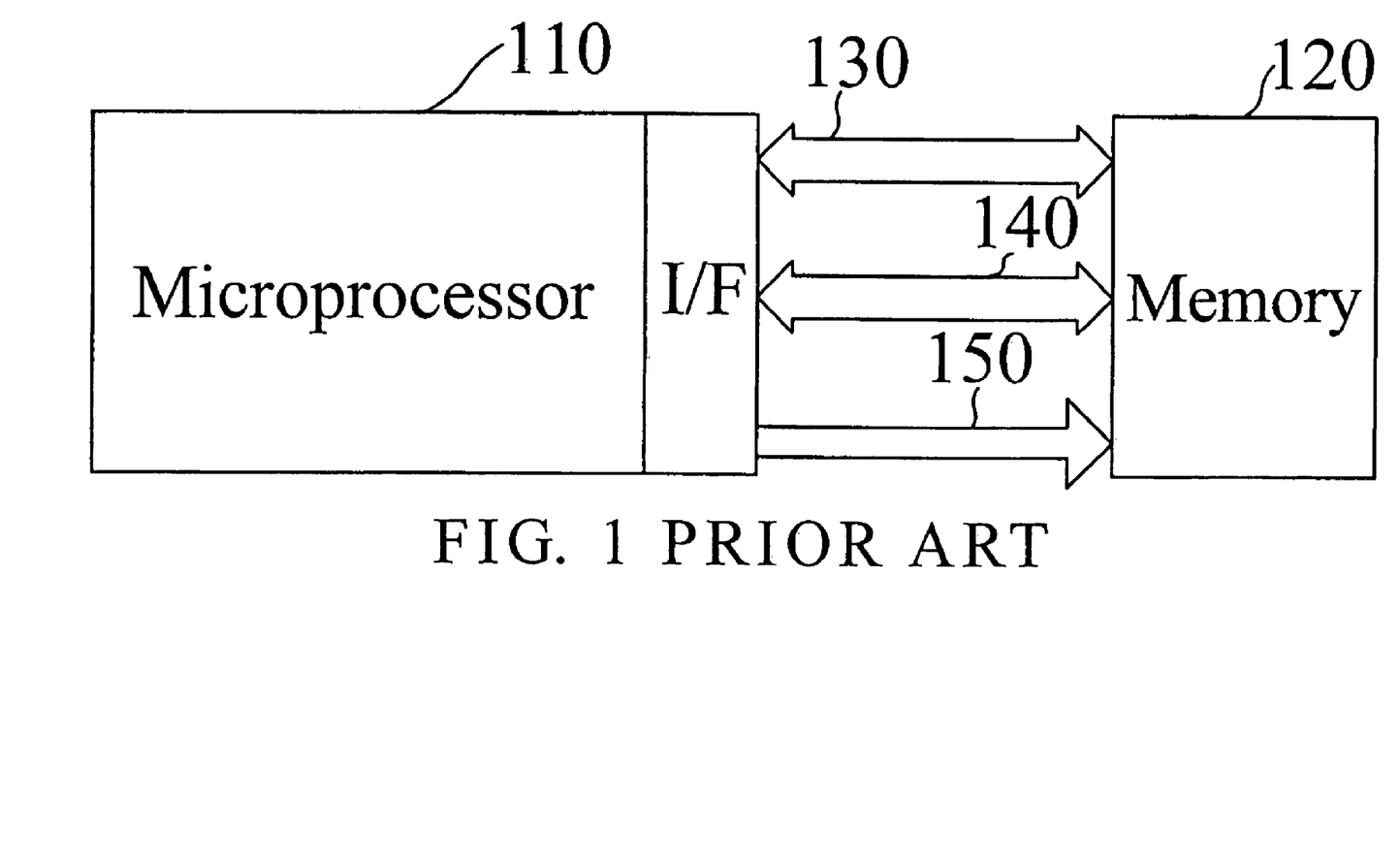
FIG. 1 is a schematic diagram of a conventional extensible time-sharing bus structure.

A conventional micro-control system essentially consists of a microprocessor, a memory and an input and output (I/O) device. As shown in FIG. 1, data transfer between the microprocessor 110 and the memory 120 (or the I/O device) is proceeded through an address bus 130, a data bus 140 and access control lines 150. A width of the address bus 130 can represent a size of memory. For example, 8 address lines indicate the most memory capacity of 256 bytes.

When the memory of the micro-control system is increased, the width of the address bus 130 is accordingly increased. For example, when the memory capacity is increased to 64 k bytes, address line number is increased to 16. Thus, in addition to increasing PCB cost, memory wiring and package cost increased, and the memory capacity of the entire system cannot be extended after designed completely, which causes the manufacture and use limits.

Figure 2:
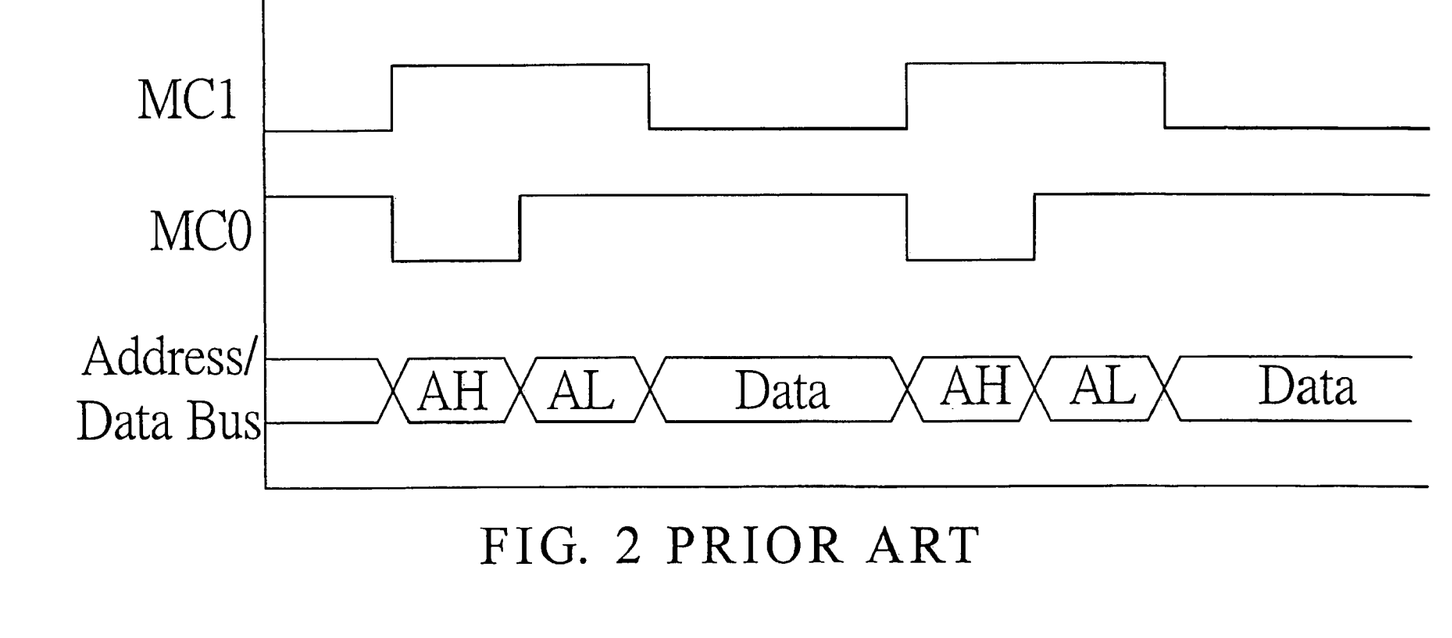
FIG. 2 is a timing of a conventional extensible time-sharing bus structure.

To overcome aforementioned problem, U.S. Pat. No. 6,493,773 granted to Daniel, et al. for a "Data validity measure for efficient implementation of first-in-first-out memories for multi-processor systems" utilizes an extensible time-sharing bus structure to send addresses and data on a same address and data bus. FIG. 2 shows the operation of the bus structure. As shown, when a control signal MC1 is at high Level and a control signal MC0 is at low level, the bus sends a high byte address AH. When the control signals MC1 and MC0 are respectively at high level, the bus sends a low byte address AL. When MC1 is at low level and MC0 is at high level, the bus sends a byte of data. A slave device combines the AH and AL to obtain 16 address lines. As such, the structure does not require extending to 16 address lines since access to an extended 16-byte memory capacity is still available.

However, for increasingly complicated applications, a memory capacity of 64 k bytes cannot meet with the requirements. For accessing a memory capacity over 64 k bytes, such a bus structure can use memory bank switch to overcome insufficient address lines. However, it requires increasing time to switch memory banks so as to reduce system performance. Further, such a bus structure can only perform memory mapping access thereon, without the capability of I/O mapping access or block burst transmission.

Therefore, it is desirable to provide an improved bus structure to mitigate and/or obviate the aforementioned problems.

SUMMARY OF THE INVENTION

An object of the invention is to provide an enhanced structure of extensible time-sharing bus, thereby reducing pin number of an IC chip.

Another object of the invention is to provide an enhanced structure of extensible time-sharing bus, thereby conveniently extending memory capacity.

A further object of the invention is to provide an enhanced structure of extensible time-sharing bus, thereby performing I/O mapping access.

A still further object of the invention is to provide an enhanced structure of extensible time-sharing bus, thereby performing block access.

In accordance with one aspect of the present invention, there is provided an enhanced structure of extensible time-sharing bus. The enhanced structure of extensible time-sharing bus includes a master bus interface and a slave bus interface. The master bus interface connects with the slave bus interface through an address and data bus and at least two control lines. The address and data bus applies time-sharing to address and data transfer between the master device and the slave device. The at least two control lines are driven to logic high or low by the master device, such that address transfer, output/input address, data read or data write is determined on the address and data bus by the master device and the slave device in accordance with a logic combination of the control lines.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
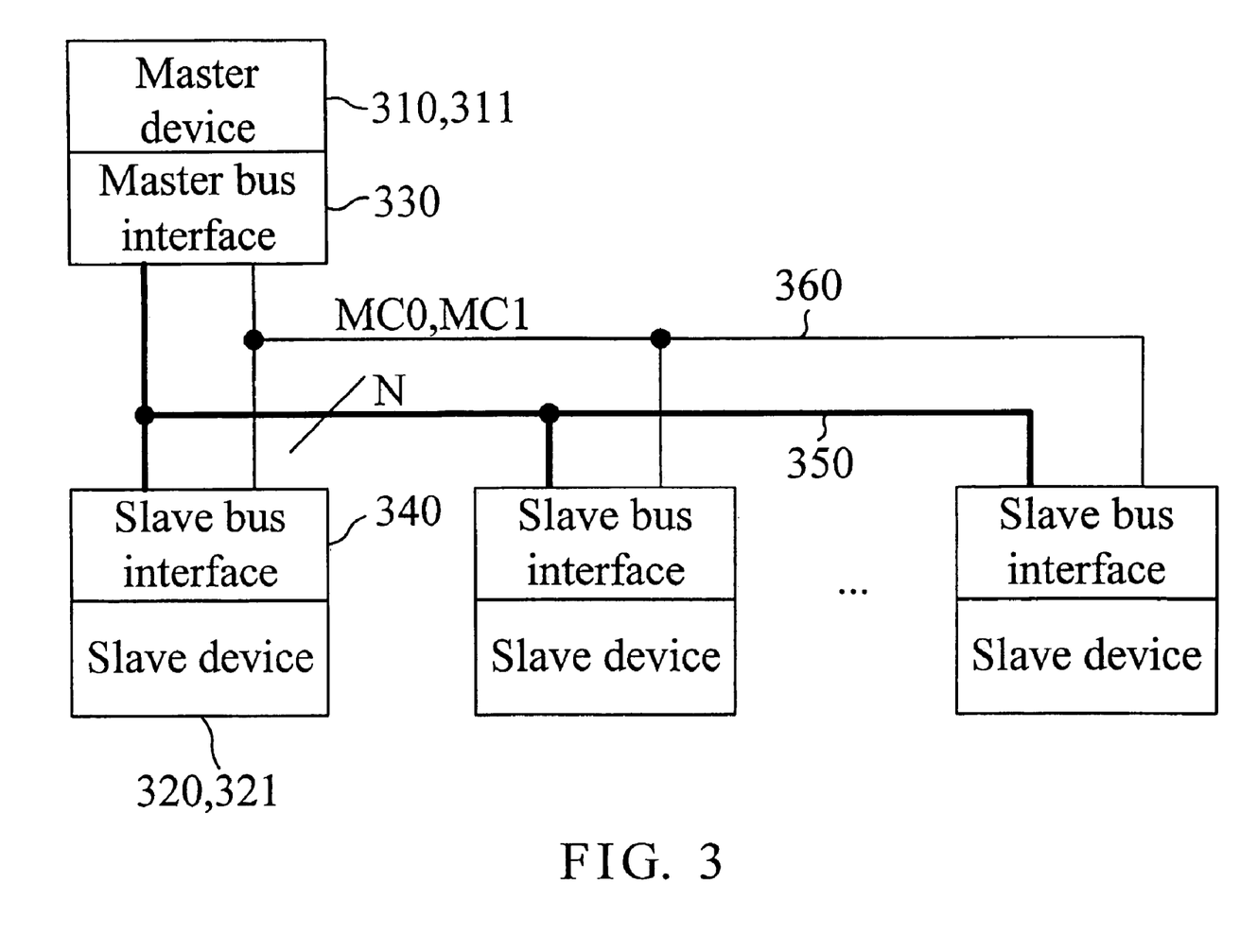
FIG. 3 is a schematic diagram of an enhanced structure of extensible time-sharing bus in accordance with the invention.

FIG. 3 is a preferred embodiment of an enhanced structure of extensible time-sharing bus. As shown, the enhanced structure of extensible time-sharing bus is used to read and write data between a master device 310 and at least one slave device 320. In this embodiment, the master device 310 can be a microprocessor 311 and the slave device 320 can be a memory 321. The enhanced structure of extensible time-sharing bus essentially includes a master bus interface 330 and a slave bus interface 340. The master bus interface 330 is connected to the slave bus interface 340 by an N-bit address and data bus 350 and at least two control lines 360. The address and data bus 350 can transfer addresses and data between the microprocessor 311 and the memory 321. The control lines 360 can determine to transfer addresses, read data or write data on the address and data bus 350.

Figure 4:
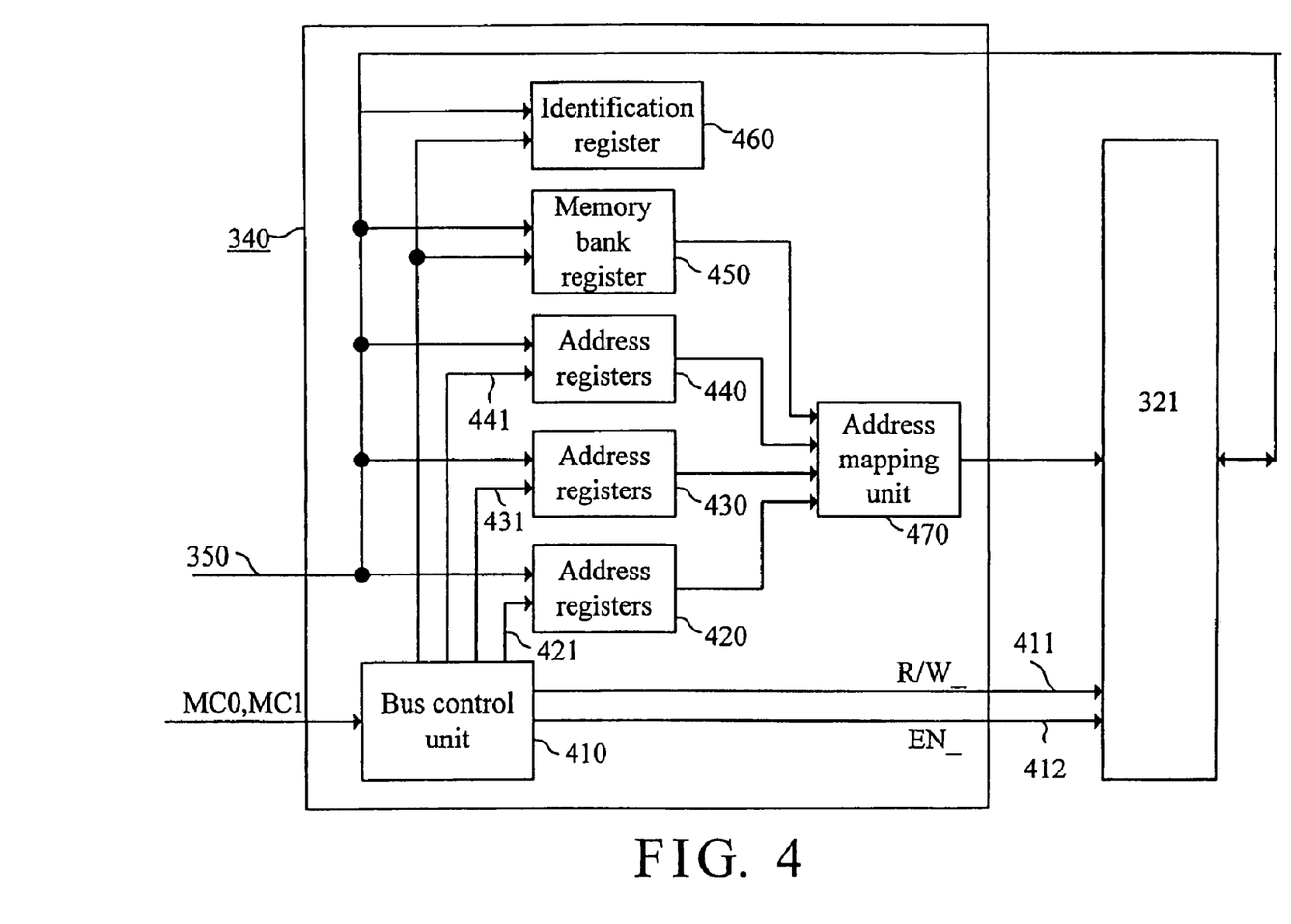
FIG. 4 is a functional block diagram of a slave bus interface in accordance with the invention.

FIG. 4 is a functional block diagram of a slave bus interface 340 in accordance with the invention. As shown, the slave bus interface 340 has a bus control unit 410 to decode a logic combination of the control lines MC0 and MC1 as usual and to accordingly determine an information transferred on the common bus, thereby sending a corresponding access control signal to the memory 321 for properly completing the operation of memory access.

Further, the slave bus interface 340 has address registers 420, 430 and 440 to lock an address of the memory 321 to be accessed. Namely, when the bus control unit 410 determines that the address and data bus 350 is transferring an address, the address is locked in the address register 420, 430 and 440. In this preferred embodiment, the address registers 420 and 430 are flip/flops respectively to hold the high and the middle portions of the address while the address register 440 is a latch to hold the low portion of the address. As such, a total address space of $2^{3N}$ can be addressed by the complete address that is held to identify a memory to be accessed.

Figure 5:
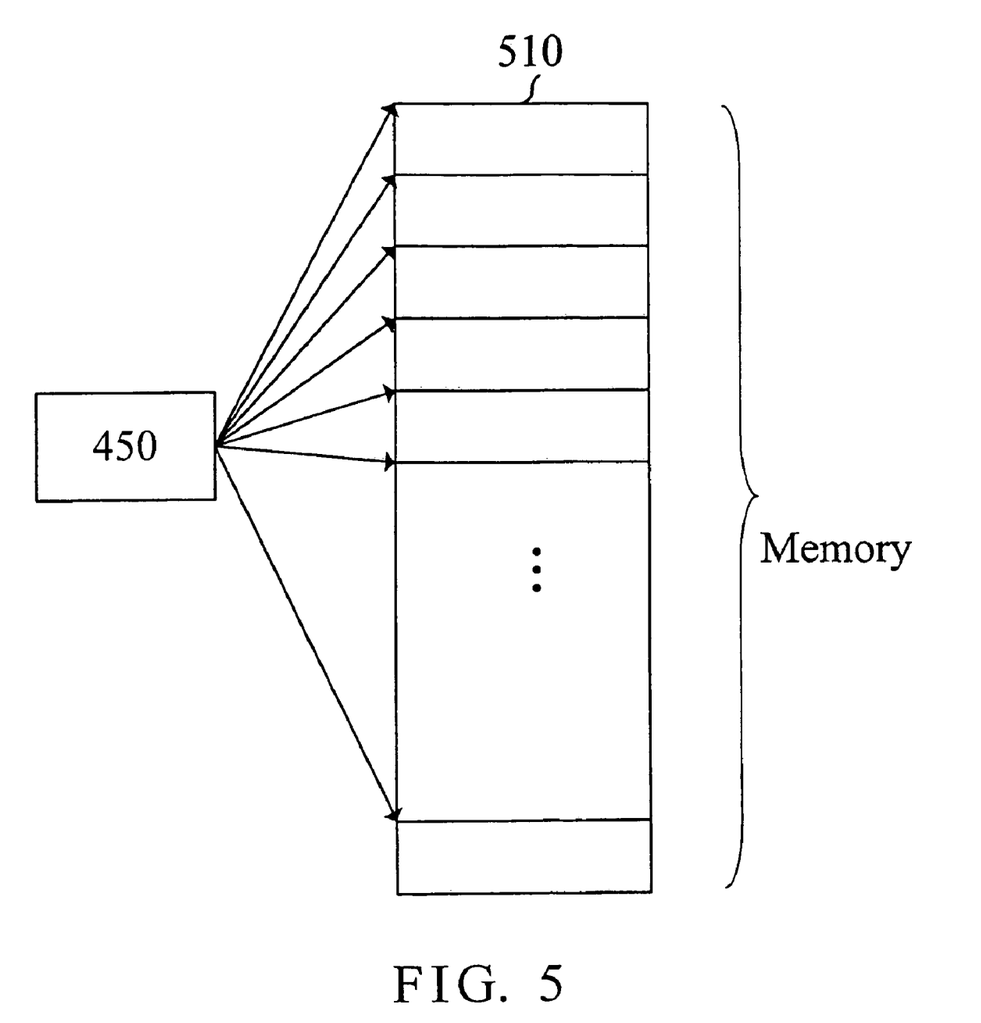
FIG. 5 is a diagram of an exemplary memory mapping used by an enhanced structure of extensible time-sharing bus in accordance with the invention.

The complete address held by the address registers 420, 430 and 440 is thus used to address the memory 321 for accessing a specific memory location. To further extend accessible memory capacity, the slave bus interface 340 has a memory bank register 450 to record locations of plural memory banks provided by the memory 321. As such, the content of the memory bank register 450 is combined with the content of the address registers 420, 430 and 440 for mapping to a physical memory address through the computation of an address mapping unit 470. As shown in FIG. 5, in this preferred embodiment, the memory bank register 450 has N bits that can record $2^N$ memory banks 510, and further an address space of $2^{4N}$ can be obtained by memory mapping as combining the $2^N$ memory banks 510 provided by the memory bank register 450 and the memory space of $2^{3N}$ provided by the address registers 420, 430 and 440.

Referring again to FIG. 4, the slave bus interface 340 further has an identification register 460 to record its identification number. When an identification number sent by the master bus interface 330 is identical to the identification number of a respective slave bus interface 340, the slave bus interface 340 will be enabled. Accordingly, a master device 310 can access data of plural slave devices 320, which further extends accessible memory capacity.

In this embodiment, the identification register 460 has N bits that can identify $2^N$ slave devices 320. Therefore, an address space of $2^{5N}$, not $2^N$ for a typical N-bit bus, can be obtained by operation of the address registers 420, 430, 440, the memory bank register 450 and the identification register 460. Further, an address space of $2^{4N}$ can be obtained even if the identification register 460 is not used, and $2^{3N}$ can be obtained without using the identification register 460 and the memory bank register 450. As such, the memory space can be increased or decreased as required in the system and is not restricted by the width of the address bus.

Figure 6:
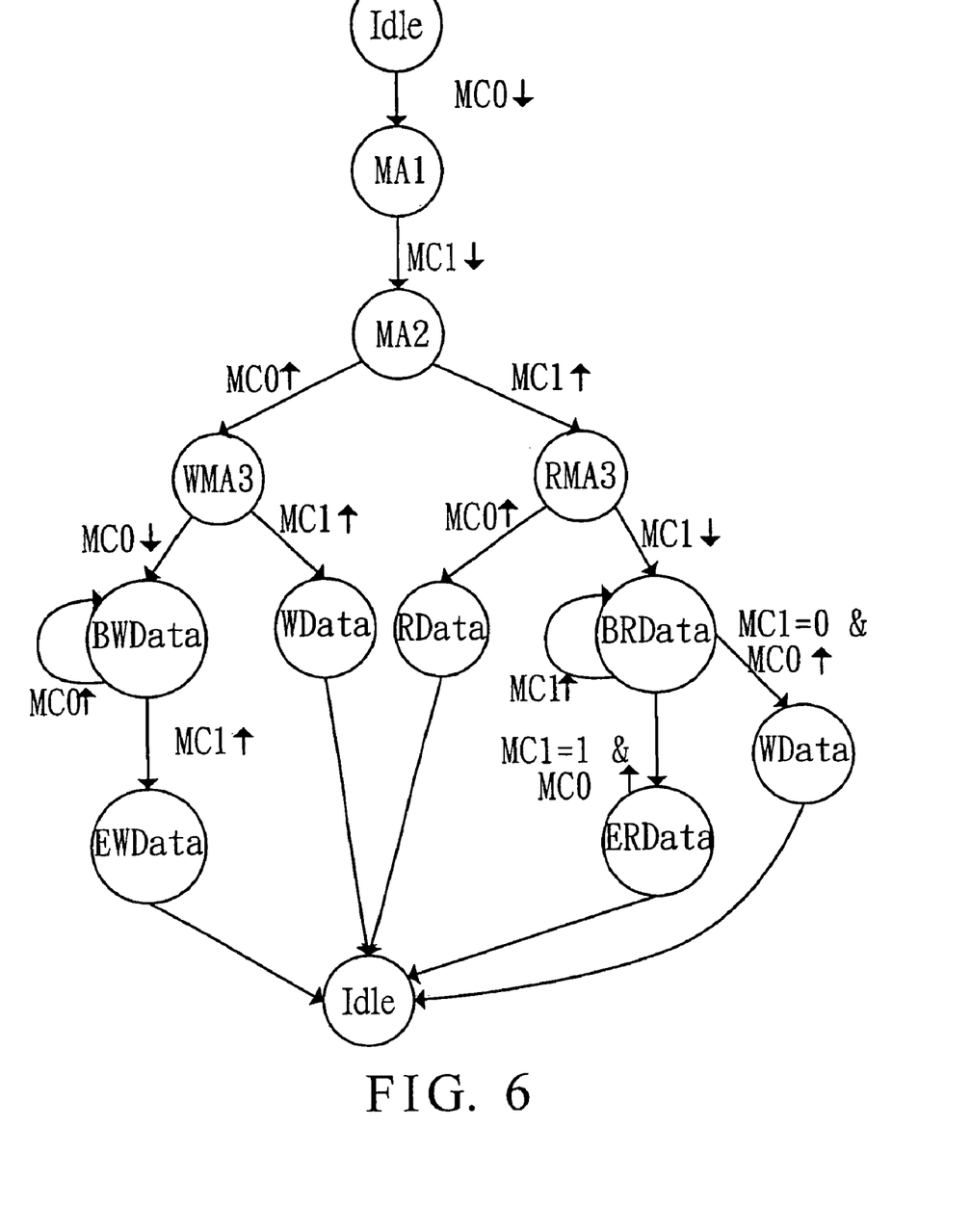
FIG. 6 is a state transition diagram of memory access in the bus control unit in accordance with the invention.
Figure 7:
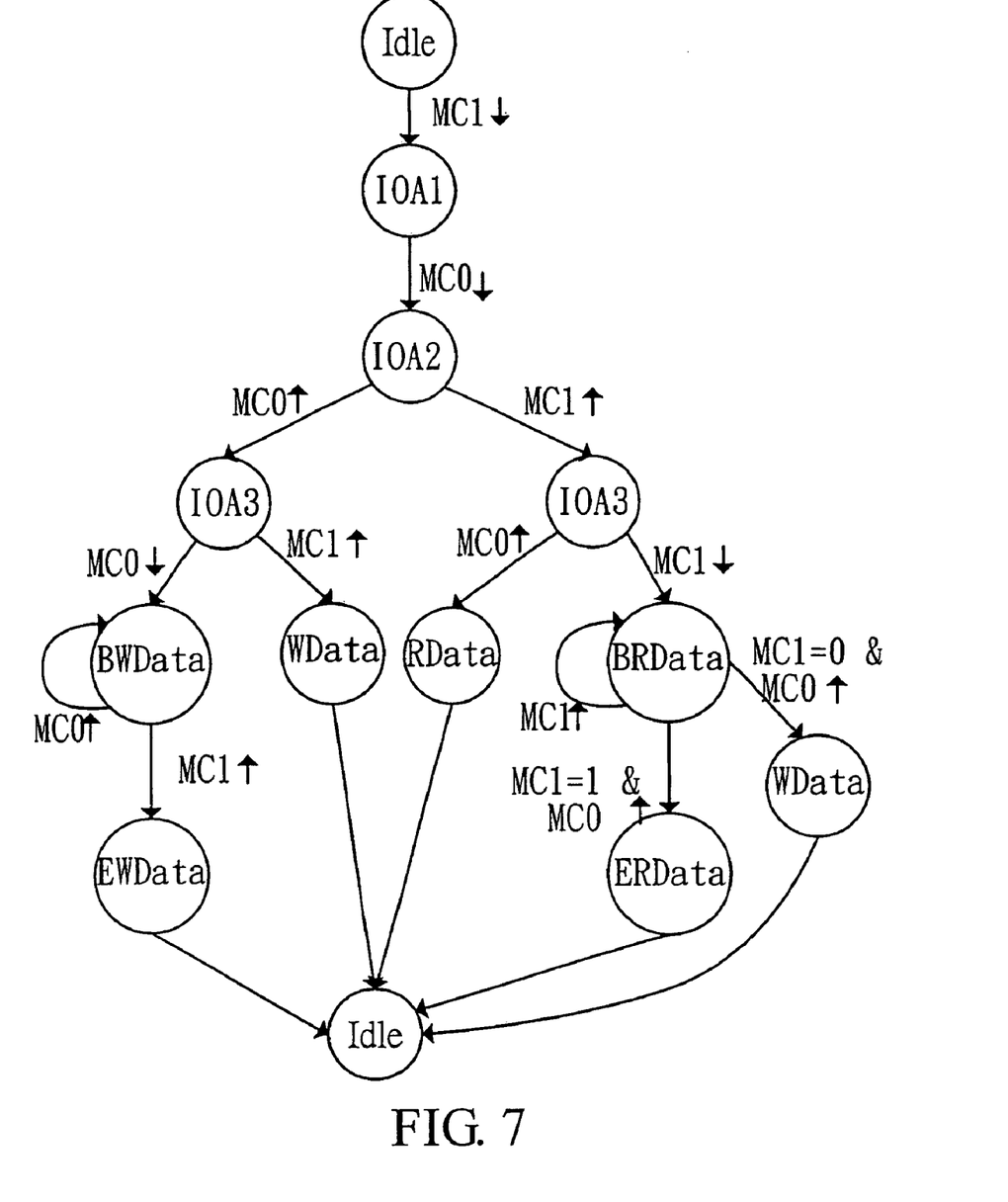
FIG. 7 is a state transition diagram of I/O access in the bus control unit in accordance with the invention.

For an example of the enhanced structure of extensible time-sharing bus with two control lines MC0 and MC1, when data is to be read or written, the two control lines MC0 and MC1 are driven by the microprocessor 311 to be logic high or low to define various access cycles. When the enhanced bus is at idle, the control lines MC0 and MC1 are logic high. When the microprocessor 311 requires performing a memory mapping access, the control line MC0 becomes logic low. When the microprocessor 311 requires performing an I/O mapping access, the control line MC1 becomes logic low. When the microprocessor 311 requires performing a write operation, the two control lines MC0 and MC1 become logic low after the control line MC0 is driven to be logic high. When the microprocessor 311 requires performing a read operation, the two control lines MC0 and MC1 become logic low after the control line MC1 is driven to be logic high. FIG. 6 is a diagram of state transition of memory access in the bus control unit 410, and FIG. 7 is a diagram of state transition of I/O access in the bus control unit 410, thereby completing various access cycles performed on the enhanced bus. Those skilled in the art will appreciate that, for achieving the state transition shown in FIGS. 6 and 7, a state machine is inherent in the bus control unit 410.

Figure 8:
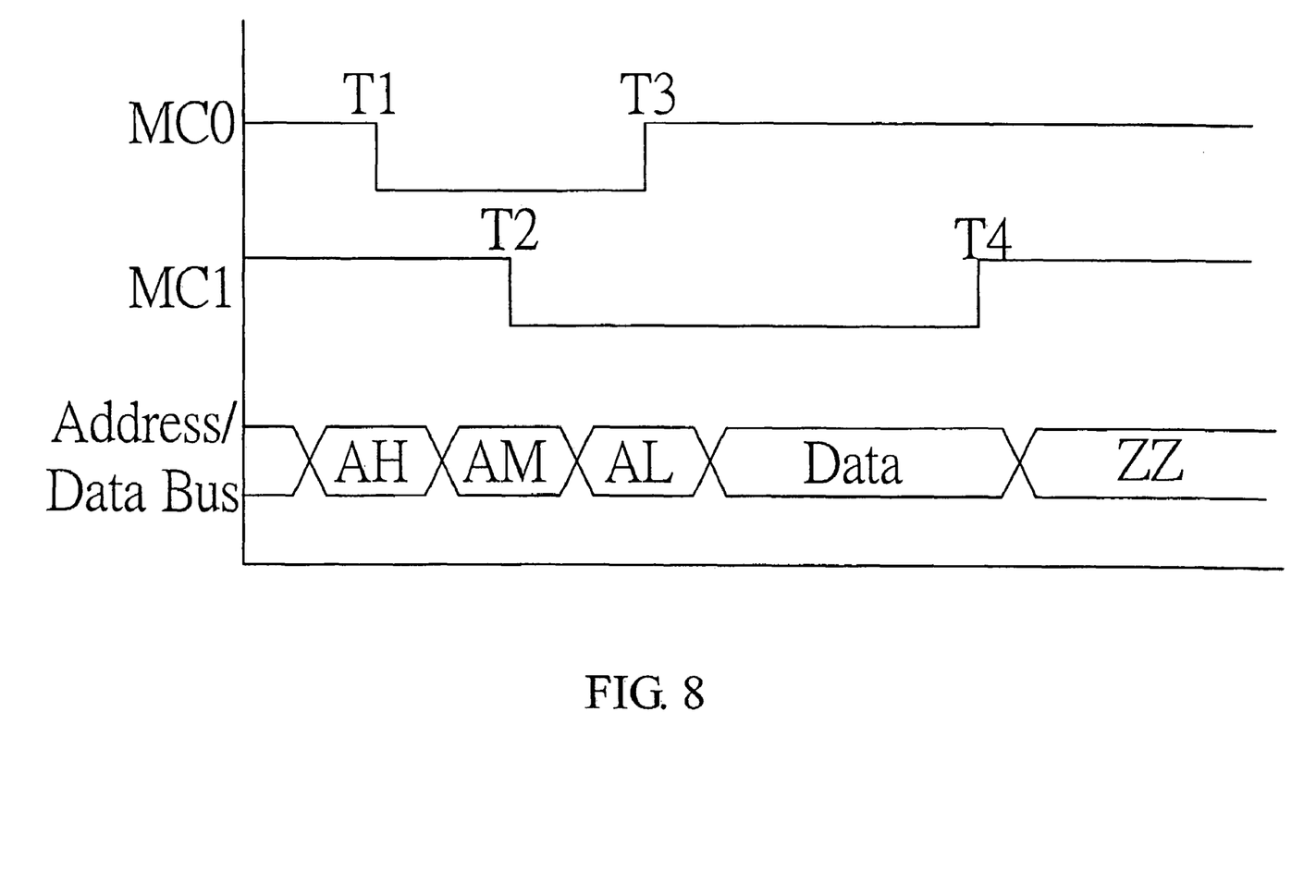
FIG. 8 is a timing diagram of a memory mapping write cycle in accordance with the invention.

FIG. 8 is a timing diagram of a memory mapping write cycle. Please also refer to FIG. 4. At T1, since a memory mapping write cycle is performed, the control line MC0 is driven to be logic low such that the control line MC0 at logic low and the control line MC1 at logic high are detected by the bus control unit 410. Accordingly, the bus control unit 410 enters in a MA1 state and occur a control signal 421 to drive the address register 420 for holding the high address part AH of information sent by the address and data bus 350. At T2, the control line MC1 becomes logic low such that the bus control unit 410 enters in a MA2 state and produces a control signal 431 to drive the address register 430 for holding the middle address part AM of information sent by the address and data bus 350. At T3, the control line MC0 becomes logic high such that the bus control unit 410 enters in a WMA3 state and produces a control signal 441 to drive the address register 440 for holding the low address part AL of information sent by the address and data bus 350. At this point, the control line MC0 is driven to be logic high earlier than the control line MC1 such that a write cycle is detected by the bus control unit 410. The control line MC1 becomes logic high at T4 to indicate that the master device 310 is ready to end the memory mapping write cycle. Accordingly, the bus control unit 410 enters in a write data state Wdata and produces two control signals 411, 412 to write the information DATA sent by the address and data bus 350 into the memory 321.

Figure 9:
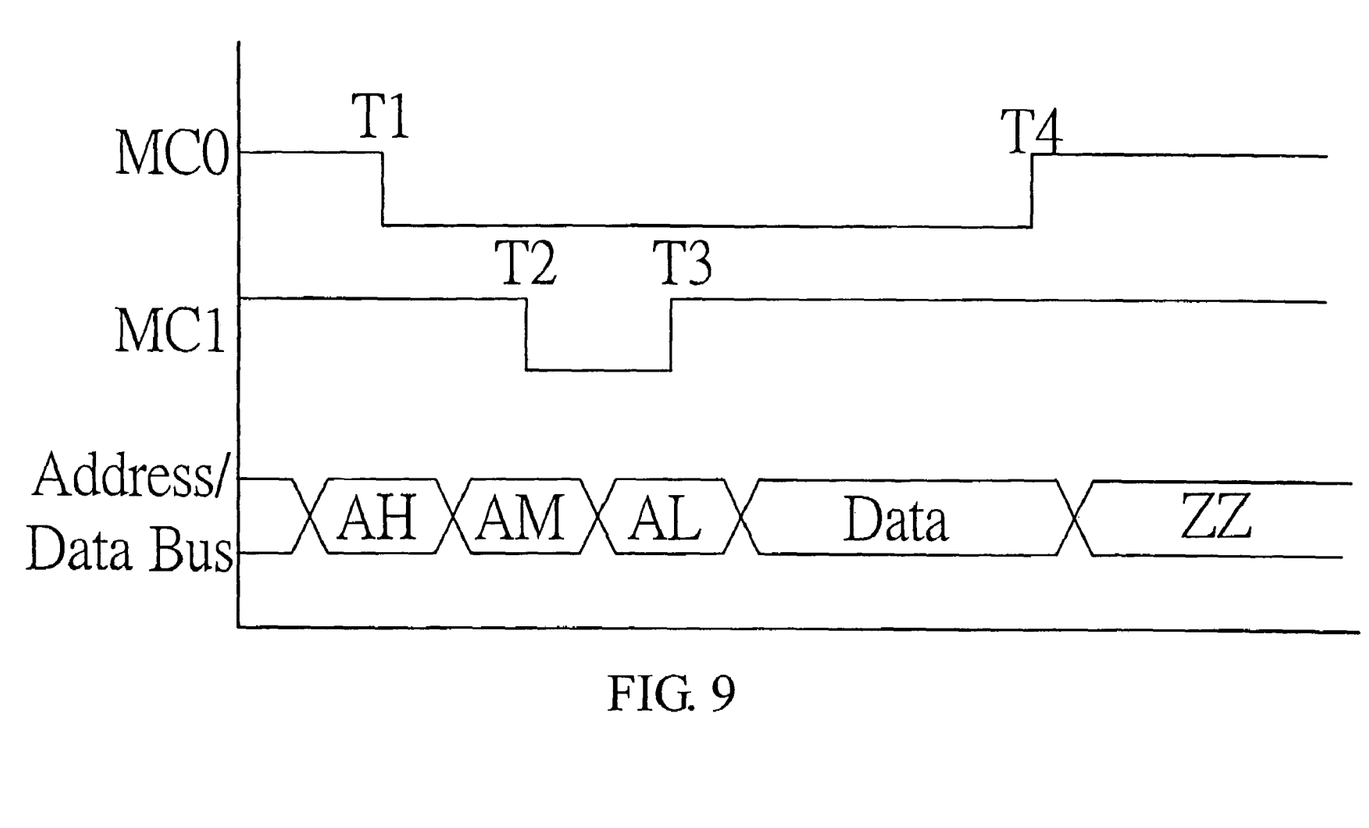
FIG. 9 is a timing diagram of a memory mapping read cycle in accordance with the invention.
Figure 10:
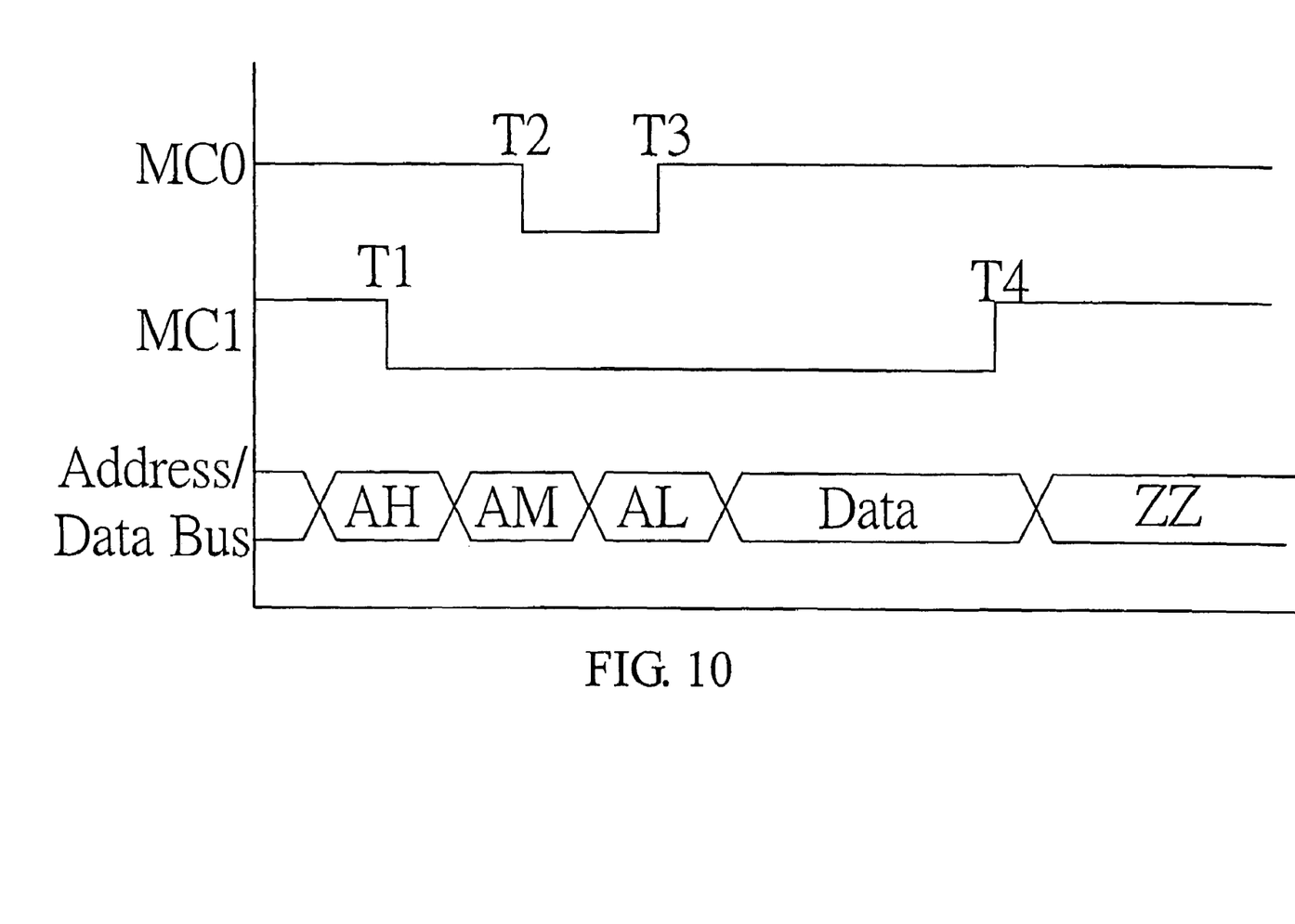
FIG. 10 is a timing diagram of an I/O mapping write cycle in accordance with the invention.
Figure 11:
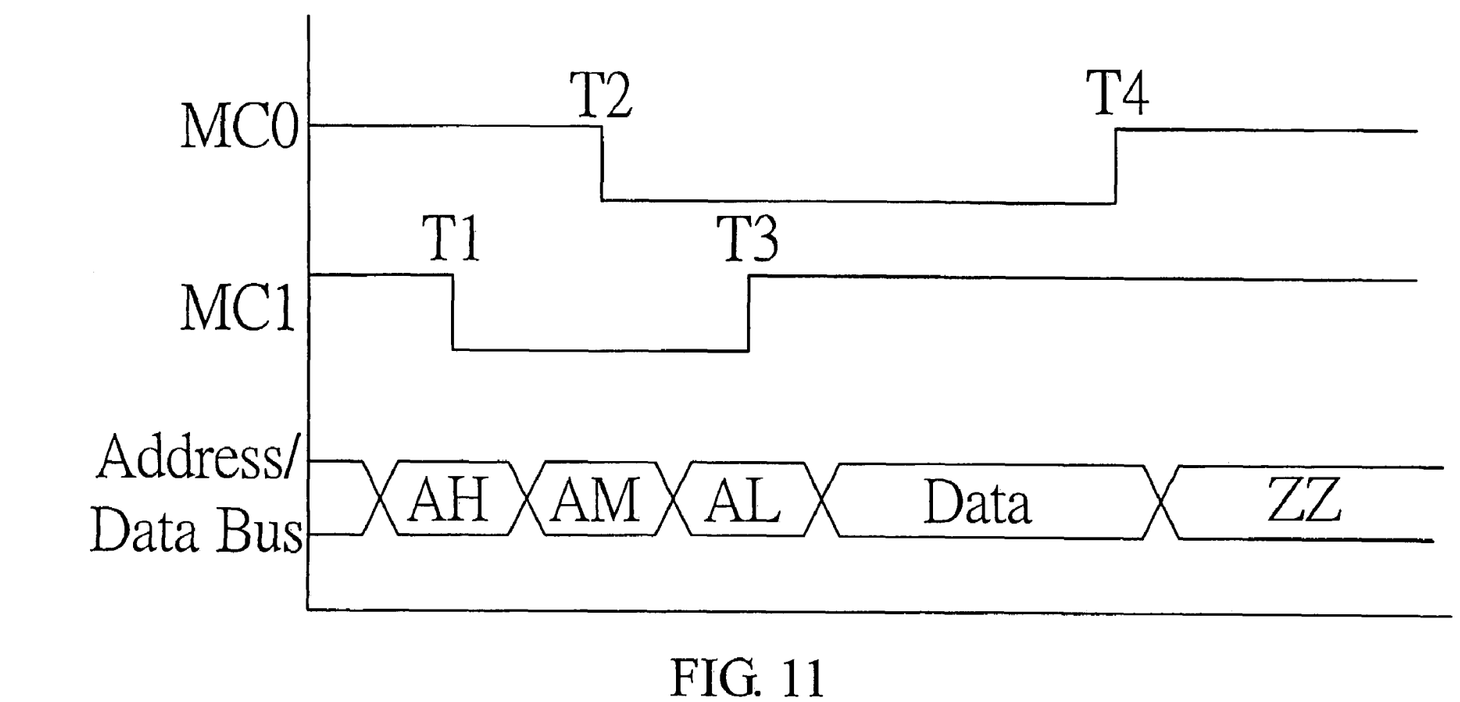
FIG. 11 is a timing diagram of an I/O mapping read cycle in accordance with the invention.

Similarly, FIG. 9 is a timing diagram of a memory mapping read cycle. Please also refer to FIG. 4. As compared to FIG. 8, an essential difference is at T3 that the control line MC1 is driven to be logic high earlier than the control line MC0 such that a read cycle is detected by the bus control unit 410. FIG. 10 is a timing diagram of an I/O mapping write cycle. As compared to FIG. 8, an essential difference is at T1 that the control line MC1 is driven to be logic low earlier than the control line MC0 such that an I/O write cycle is detected by the bus control unit 410. FIG. 11 is a timing diagram of an I/O mapping read cycle. As compared to FIG. 10, an essential difference is at T3 that the control line MC1 is driven to be logic high earlier than the control line MC0 such that an I/O read cycle is detected by the bus control unit 410.

Figure 12:
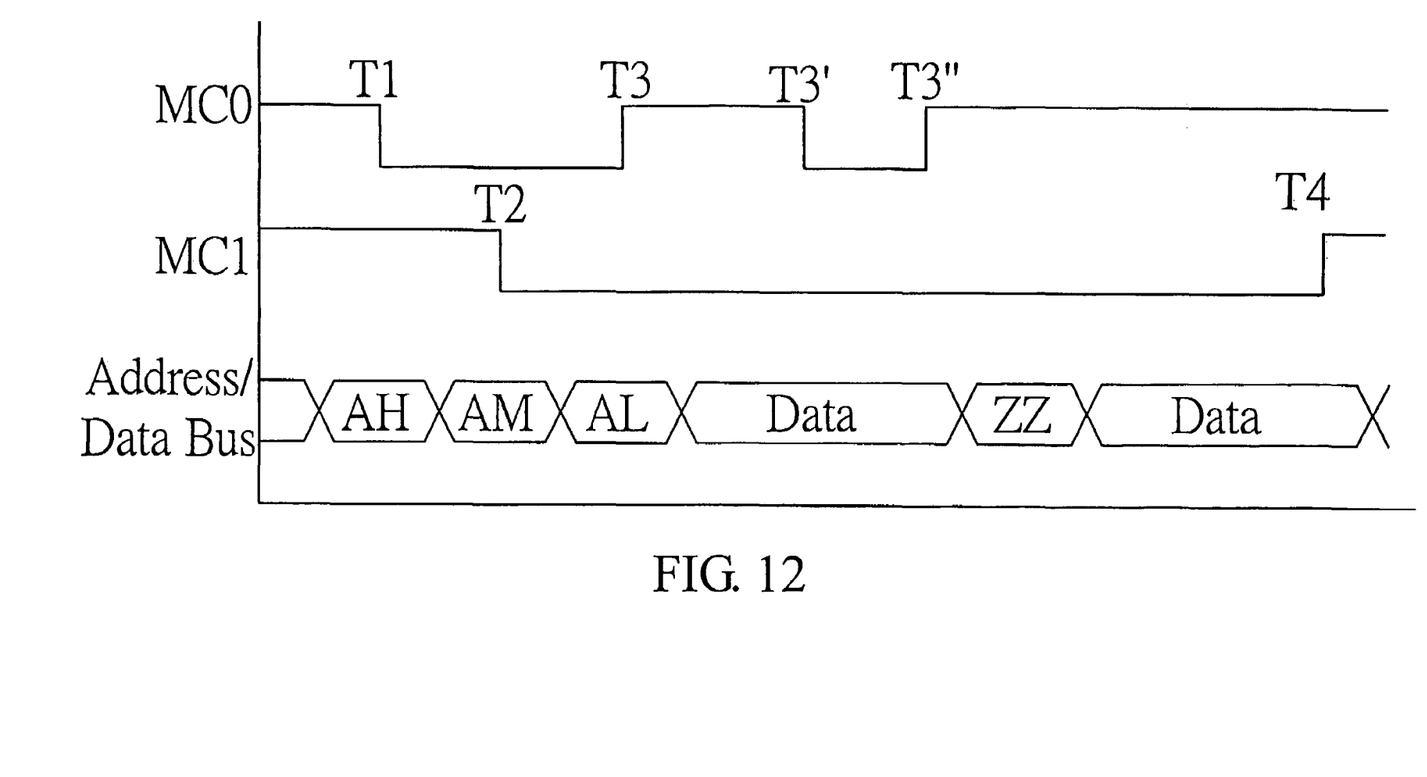
FIG. 12 is a timing diagram of a block memory mapping write cycle in accordance with the invention.

FIG. 12 is a timing diagram of a block memory mapping write cycle. Please also refer to FIG. 4. At T3, the control line MC0 is driven to be logic high earlier than the control line MC1 such that a write cycle is detected by the bus control unit 410. At T3', the control line MC0 goes from logic high to low such that the bus control line unit 410 enters in a burst write data state BWData. At T3", the control line MC0 goes from logic low to high such that the bus control line unit 410 produces two control signals 411, 412 to write an information DATA sent by the address and data bus 350 into the memory 321 and subsequently re-enter in the state BWData. At T4, the control line MC1 becomes logic high to indicate that the master device 310 is ready to end the write cycle. At this point, the bus control unit 410 enters in a extended write data state EWData and produces two control signals 411, 412 to thus write the last information DATA sent by the address and data bus 350 into the memory 321.

Figure 13:
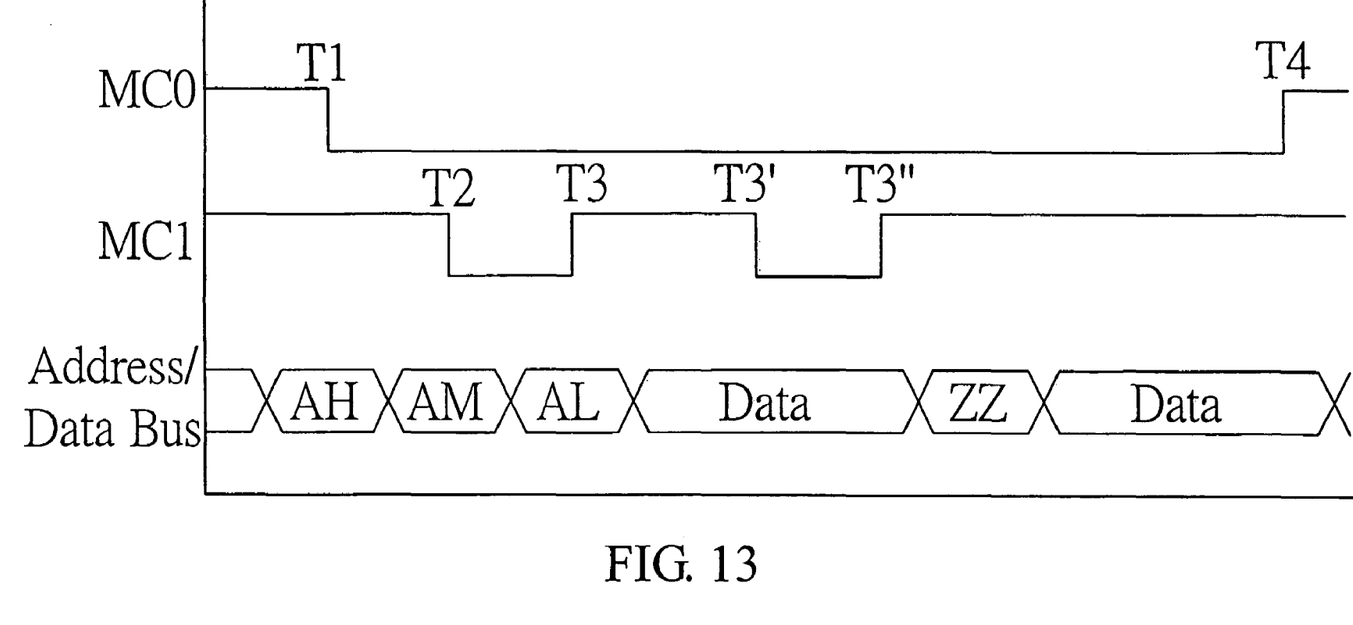
FIG. 13 is a timing diagram of a block memory mapping read cycle in accordance with the invention.

FIG. 13 is a timing diagram of a block memory mapping read cycle. Please also refer to FIG. 4. At T3, the control line MC1 is driven to be logic high earlier than the control line MC0 such that a block read cycle is detected by the bus control unit 410. Accordingly, the bus control unit 410 produces two control signals 411, 412 to read associated data out of the memory 321 to the address and data bus 350, thereby adapt to setting time and holding time of the master device 310 as reading. At T3', the control line MC1 goes from logic high to low such that the bus control line unit 410 enters in a burst read data state BRData. At T3", the control line MC1 goes from logic low to high such that the master device 310 reads the information on the address and data bus 350 and the bus control line unit 410 re-enters in the burst read data state BRData. At T4, the control line MC0 becomes logic high to indicate that the master device 310 is ready to end the read cycle. At this point, the bus control unit 410 enters in a extended read data state ERData and produces two control signals 411, 412 to read the last information DATA from the memory 321 to the address and data bus 350.

Figure 14:
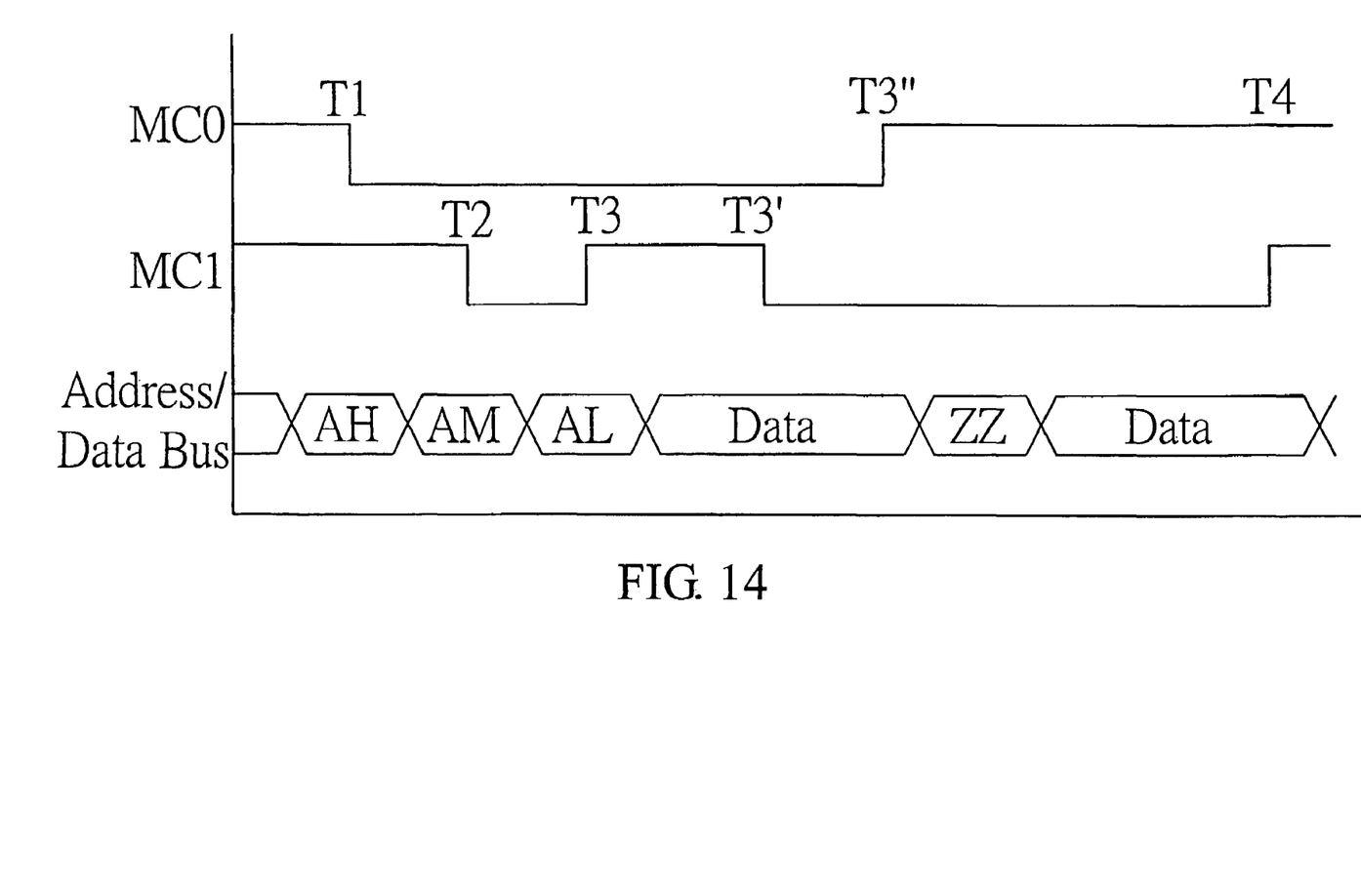
FIG. 14 is a timing diagram of a memory mapping I/O access cycle in accordance with the invention.

FIG. 14 is a timing diagram of a memory mapping Read-Modify-Write access cycle. Please also refer to FIG. 4. At T3, the control line MC1 is driven to be logic high earlier than the control line MC0 such that a read cycle is detected by the bus control unit 410. Accordingly, the bus control unit 410 produces two control signals 411, 412 to read associated data out of the memory 321 to the address and data bus 350, thereby adapt to setting time and holding time of the master device 310 as reading. At T3', the control line MC1 goes from logic high to low such that the bus control line unit 410 enters in a burst read data state BRData. At T3", the control line MC0 goes from logic low to high such that the master device 310 reads the data on the address and data bus 350, and the bus control unit 410 enters in a write data state WData. At T4, the control line MC1 goes from logic low to high to indicate that the master device 310 is ready to end the read cycle. At this point, the bus control unit 410 produces two control signals 411, 412 to write an information DATA of the data sent by the address and data bus 350 into the memory 321 to thus complete the memory mapping access cycle.

Similarly, the timing of an I/O mapping write, read or access cycle and the timing of a block memory mapping write, read or access cycle can be obtained in accordance with FIG. 7, so as not to be depicted more. For the I/O mapping write and read cycles in respective FIG. 10 and 11, the I/O mapping requires an address number of $2^{3N}$. However, for simplifying the hardware of the bus control unit 410, the address number can be reduced to $2^N$ in design. Besides, any person in the art can use hardware description language such as Verilog or VHDL to easily implement the hardware design of the bus control unit 410 in accordance with the state transfers diagram of FIG. 6 and FIG. 7.

As cited, with the use of the inventive enhanced structure of extensible time-sharing bus, the following objects and advantages are obtained:

(1) Flexible memory capacity: A memory capacity can be extended only by limited width of address bus such that a microprocessor's user can increase or decrease the memory capacity as required in applications, without changing the microprocessor. For example, when the address and data bus 350 is an 8-bit, only a total 64 k memory space can be used in the prior art, whereas in the invention a 24M memory space and a 24M I/O space can be provided.

(2) Saving cost: Pin number for the microprocessor and memory is fixed even though the memory capacity is increased, thereby miniaturizing the pin number and effectively saving system PCB, wiring, package costs. In addition, due to the fixed pin number, the chip size is relatively reduced in an application of requiring a large memory.

(3) Additional access variety: The master device 310 selects an I/O mapping or a memory mapping in accordance with the features of the slave devices 320 for access.

(4) Additional access speed: The master device 310 can execute a block transmission to speed data transfer between the master 310 and the slave devices 320.

Although the present invention has been explained in relation to its preferred embodiment, it is to be understood that many other possible modifications and variations can be made without departing from the spirit and scope of the invention as hereinafter claimed.

What is claimed is:

1. An enhanced structure of extensible time-sharing bus, which is used to data read and write between a master device and at least one slave devices, the enhanced structure comprising a master bus interface and a slave bus interface, wherein the master bus interface connects with the slave bus interface through an address and data bus and at least two control lines, the address and data bus applies time-sharing to address and data transfer between the master device and the slave device, the at least two control lines are driven to a first or second logic level by the master device, and a state machine in a bus control unit of the slave bus interface performs a state transition in accordance with a time-depedent logic combination of the control lines such that address transfer, input and output (I/O) address, data read or data write is determined on the address and data bus by the master device and the slave device.

2. The enhanced structure as claimed in claim 1, wherein the slave bus interface has at least an address registers to latch an address to be read or written when a read or write is processing.

3. The enhanced structure as claimed in claim 1, wherein the master device is a microprocessor and the slave device is a memory.

4. The enhanced structure as claimed in claim 1, wherein the first logic level is logic low and the second logic level is logic high.

5. The enhanced structure as claimed in claim 2, wherein the slave bus interface further has a memory bank register to record a location of memory bank provided by the slave device, thus contents of the memory bank register and the memory address register are combined to produce a physical address from memory mapping through a computation of an address mapping unit of the slave bus interface.

6. The enhanced structure as claimed in claim 2, wherein the two control lines are a first control line and a second control line.

7. The enhanced structure as claimed in claim 5, wherein the slave bus interface further has an identification register to record its identification number such that when the identification number is sent by the master bus interface, the slave bus interface is accordingly enabled.

8. The enhanced structure as claimed in claim 6, wherein a memory access having a memory write-in and a memory readout is performed when the first control line goes to the first logic level earlier than the second control line.

9. The enhanced structure as claimed in claim 6, wherein an I/O access having an I/O write-in and an I/O readout is performed when the second control line goes to the first logic level earlier than the first control line.

10. The enhanced structure as claimed in claim 8, wherein the memory write-in is performed when the first control line goes to the second logic level earlier than the second control line.

11. The enhanced structure as claimed in claim 8, wherein the memory readout is performed when the second control line goes to the second logic level earlier than the first control line.

12. The enhanced structure as claimed in claim 9, wherein the I/O write-in is performed when the first control line goes to the second logic level earlier than the second control line.

13. The enhanced structure as claimed in claim 9, wherein the I/O readout is performed when the second control line goes to the second logic level earlier than the first control line.

14. The enhanced structure as claimed in claim 8, wherein a block memory mapping read-out is performed when the second control line goes to the second logic level earlier than the first control line and then goes from the second logic level to the first logic level, and then the second control line goes from the first logic level to the second logic level and subsequently the first control line goes to the second logic level.

15. The enhanced structure as claimed in claim 10, wherein the address and data bus is used to transfer a write-in data when the second control line becomes the second logic level on performing the memory write-in.

16. The enhanced structure as claimed in claim 11, wherein the address and data bus is used to transfer a readout data when the first control line becomes the second logic level on performing the memory readout.

17. The enhanced structure as claimed in claim 12, wherein the address and data bus is used to transfer a write-in data when the second control line becomes the second logic level on performing the I/O write-in.

18. The enhanced structure as claimed in claim 13, wherein the address and data bus is used to transfer a readout data when the first control line becomes the second logic level on performing the I/O readout.

19. The enhanced structure as claimed in claim 8, wherein a block memory mapping write-in is performed when the first control line goes to the second logic level earlier than the second control line and then goes from the second logic level to the first logic level, and then the first control line goes from the first logic level to the second logic level and subsequently the second control line goes to the second logic level.

* * * * *